United States Patent [19]

Landers et al.

[11] Patent Number: 4,630,282

[45] Date of Patent: Dec. 16, 1986

[54] FREQUENCY-HOPPING DIGITAL DATA LINK

[75] Inventors: William A. Landers; Lynn J. Hawkey, both of Florissant, Mo.

[73] Assignee: McDonnell Douglas Corporation, Long Beach, Calif.

[21] Appl. No.: 611,764

[22] Filed: May 18, 1984

[51] Int. Cl.⁴ .............................................. H04L 9/02
[52] U.S. Cl. ........................................ 375/1; 375/2.2; 375/58; 370/11
[58] Field of Search ...................... 375/1, 2.2, 34, 58, 375/60; 455/29; 370/69.1, 11

[56] References Cited

U.S. PATENT DOCUMENTS

| | | | |
|---|---|---|---|
| 3,916,313 | 10/1975 | Lowry | 375/58 |
| 4,164,628 | 8/1979 | Ward et al. | 375/1 |
| 4,231,113 | 10/1980 | Blasbalg | 375/1 |
| 4,268,721 | 5/1981 | Nielson et al. | 179/2 DP |

OTHER PUBLICATIONS

"Frequency Hopping Systems", *Digital Communications by Satellite*, Bhargava et al., Wiley & Sons, 1981, p. 275.

Primary Examiner—Robert L. Griffin
Assistant Examiner—Raymond C. Glenny
Attorney, Agent, or Firm—Gregory A. Cone; George W. Finch; Donald L. Royer

[57] ABSTRACT

Ordinary digital data is reformed and time shifted such that it may be broadcast over a radio link which periodically shifts its frequency. The system of this invention utilizes timing information obtained from a pre-existing frequency-hopping radio link in conjunction with its own buffer and control circuitry to accurately time-position discrete digital data packets within those time bands of the radio transmission wherein the frequency is not changing from one frequency to another. In the drawing, $T_{H1}$ is a very short duration pulse which commands the AM frequency—hopping system to shift frequencies. The time period necessary for the frequency hop operation to settle down and attain a stable frequency is represented by the interval between $T_{H1}$ and $T_1$. The actual reception of the uplink message occurs in the interval between $T_3$ and $T_4$; transmission of the downlink signal from the system occurs in the interval between $T_5$ and $T_6$. The interval between $T_4$ and $T_5$ is a necessary pause at the actual station. The intervals between T1 and T3 and T6 and T allow for other delays such as slant range differences between stations, propagation delays, and timing offsets between stations.

2 Claims, 11 Drawing Figures fig. 2 fig. 2A fig. 3 fig. 4 fig. 6

FREQUENCY-HOPPING DIGITAL DATA LINK

BACKGROUND OF THE INVENTION

This invention relates to digital data transmission systems employing a radio link. More particularly, this invention relates to radio digital data links in which the frequency of the radio link shifts from one value to another in a known and periodic manner.

Frequency hopping radio links are very useful when secure radio transmissions and receptions are required. The rapid change in frequency from one known frequency to another in a seemingly random fashion almost entirely prevents either eavesdropping or jamming of the radio link. Of course, in order for the radio link to be effective, both receiver and transmitter must be synchronized in time with each other as well as each know the pseudo-random frequence of changes. Such systems have been employed by the military for many years. This military system, however, is a relatively primitive AM frequency-hopping voice radio system. In one such system, a cycle lasts approximately 62.5 milliseconds, which includes a relatively short period in which the transmission frequency shifts from one level to another in which no information may be exchanged and a relatively long remainder interval which may be used for the AM voice transmission. The relatively short "hop" interval in which the frequencies change is not detrimental to any significant degree to the transmission of audio signals representing human voice because the human ear is able to bridge over these information gaps during the "hops" with little difficulty Insofar as is known, this represents the state of the prior art. No systems are known which utilize a frequency hopping radio link to transmit digital data. This is because it would be impossible to transmit ordinary serial digital data over such a frequency hopping link because the "hop" intervals would break into the digital data stream and render the whole digital message useless. That is to say, that every bit of the digital information signal is important; portions of digital data messages may not be discarded without a total loss of information content for the entire message.

SUMMARY OF THE INVENTION

This apparatus for transmitting digital data messages over a radio system capable of changing its transmission frequency at regular intervals in a known manner comprises a timing information supply which provides information to the apparatus describing first timing intervals when the transmission frequency is temporarily constant at a given frequency and second timing intervals when the transmission frequency transitions between the first intervals and a programmed apparatus controller which receives digital data from a data source and provides digital data messages to the transmitter of the radio system which are effectively synchronized within the first intervals. Equipment delays, up and down link transmission distance delays, and timing error margins must all be taken into account by the programmed controller in order that the digital data messages be accurately positioned in time within the first intervals.

BRIEF DESCRIPTION OF THE DRAWINGS

FIGS. 10A, B, C, D and E are timing diagrams for the various signals within the system apparatus.

DETAILED DESCRIPTION OF THE INVENTION

One of the major objects of the system of this invention is to properly position short bursts of FM digital data within the shifting frequencies of the frequency hopping radio link. The system has been developed in one particular embodiment in which the radio link is between a ground station and an airplane; however, the system is adaptable to other links such as ground-to-ground radio links and air-to-air radio links. Factors which must be taken into account in properly positioning the digital data messages include the difference in slant range between the given aircraft and two ground stations, the propagation delay between ground and aircraft, the timing offset between ground and aircraft, various hardware delays in up link and down link paths, transmit-to-receiver turn-around delays, and settling times for radio frequency changes.

Figure 1:
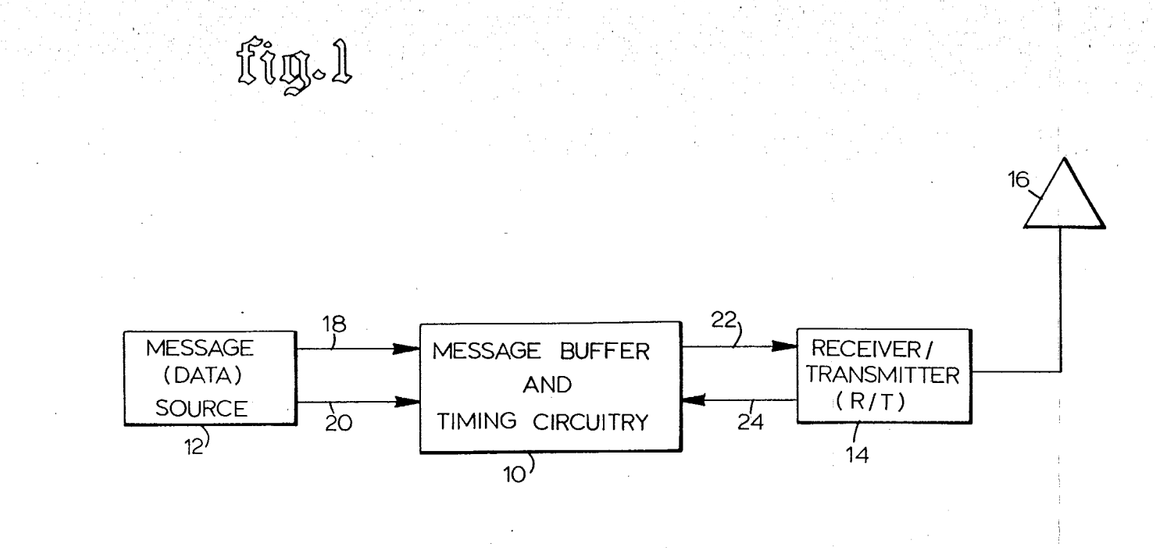
FIG. 1 is a high level block diagram showing the basic functional organization of the system of this invention within the larger environment in which it operates.

FIG. 1 shows the apparatus of this invention 10 as it is connected to the digital message source 12 and to the receiver/transmitter 14 with the frequency hopping capability which is in turn connected to a receive/transmit antenna 16. Digital data information and clock synchronization information are supplied to the message buffer and timing circuitry in block 10 over lines 18 and 20 respectively. The message buffer and timing circuitry in block 10 receives timing information over line 24 from the frequency hopping section of the receiver/transmitter 14. The block 10 then outputs the digital data burst over the data line 22 for transmission by the receiver/transmitter 14.

In the specific embodiment discussed herein, the frequency-hopping radio link receiver/transmitter has a frequency hopping cycle period of 62.5 milliseconds. At the beginning of each cycle, an anti-jamming timing (AJ TIM) signal is provided to the system. However, an interval of about 3.7 milliseconds transpires before the actual frequency hop occurs. After this frequency hop, another interval of about 14.5 milliseconds is necessary for the frequency to stabilize after the hop. The remainder of the 62.5 millisecond cycle is then available for up link or down link message transmissions over the radio link. However, various other delays must be accounted for such as the slant range differences between various stations, propagation delays between stations, timing offsets between stations, as well as a short one or two millisecond pause between up link and down link at a station. When all of these delays are accounted for, the up link message length in this particular embodiment will initiate about 29.1 milliseconds after the initial AJ TIM pulse. The up link message is about 14 milliseconds. This is followed by a one millisecond delay, which in turn is followed by the down link message which lasts 11.2 milliseconds. The remainder of the 62.5 millisecond cycle is used for the various propagation delays. These various delays will normally be known for a given radio link configuration and the duration of these delays which bracket the leading and trailing edges of the actual up link and down link message transmissions may be programmed into the various timing delays in the system controller.

Figure 10:
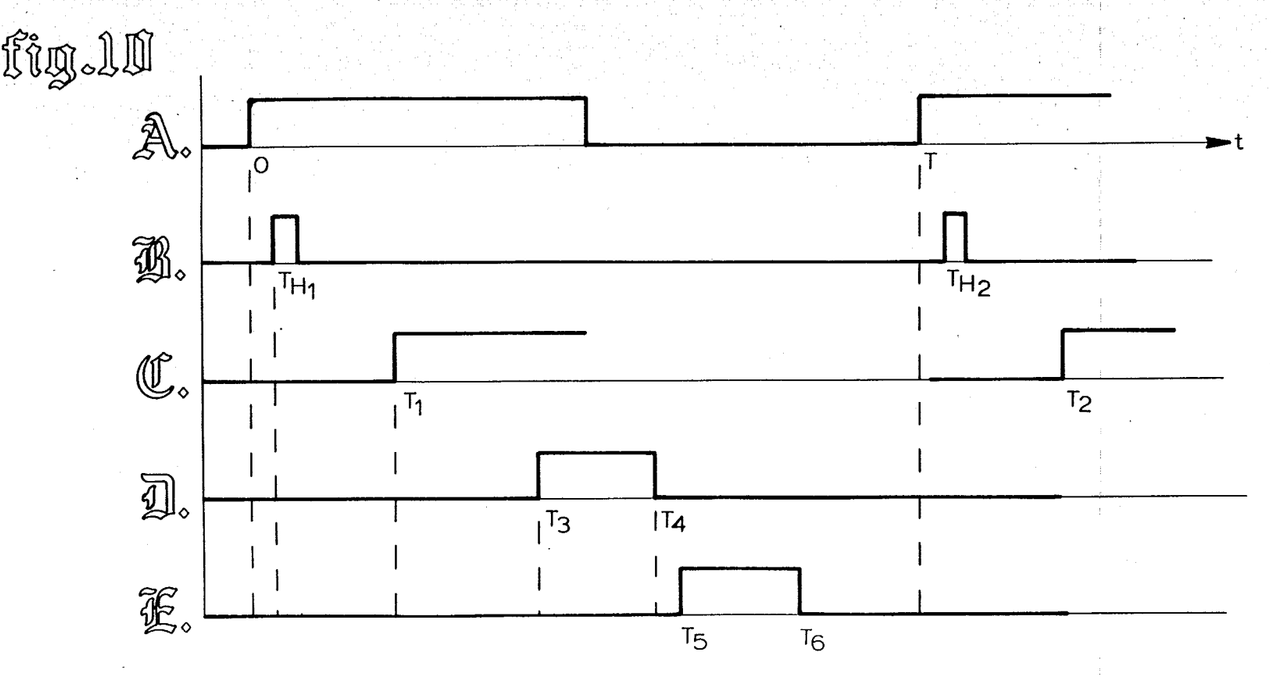

The timing relationship of these various relationships may be more clearly understood by reference to FIGS. 10A, B, C, D and E. FIG. 10A shows one cycle of the anti-jam (AJ TIM) signal. The system recognizes the pulse as the change in logic state from a low to a high level occurring at times O and T. The period for this signal is 62.5 milliseconds. FIG. 10B shows the delay between the AJ TIM pulse and the actual frequency hop. This delay is the time between O and $T_{H1}$ which is about 3.7 milliseconds. The signal at $T_{H1}$ is a very short duration pulse which commands the AM frequency - hopping system to shift frequencies. FIG. 10C demonstrates the time period necessary for the frequency hop operation to settle down and attain a stable frequency. This time period is represented by the interval between $T_{H1}$ and $T_1$ in FIG. 10C. The actual reception of the uplink message occurs in the interval between $T_3$ and $T_4$ as shown in FIG. 10D. The transmission of th downlink signal from the system occurs in the interval between $T_5$ and $T_6$ in FIG. 10E. The interval between $T_4$ and $T_5$ is a necessary pause at the actual station. The intervals between T1 and T3 and T6 and T allow for the other delays such as slant range differences between stations, propagation delays, and timing offsets between stations. The AJ TIM signal and the frequency hop pulse (at $T_{H1}$) signals originate in the AM radio frequency hopping system. The remainder of the timing is controlled by the programmable microprocessor control means for the timing points $T_1T_2$, $T_3$, $T_4$ and $T_6$.

Figure 2:
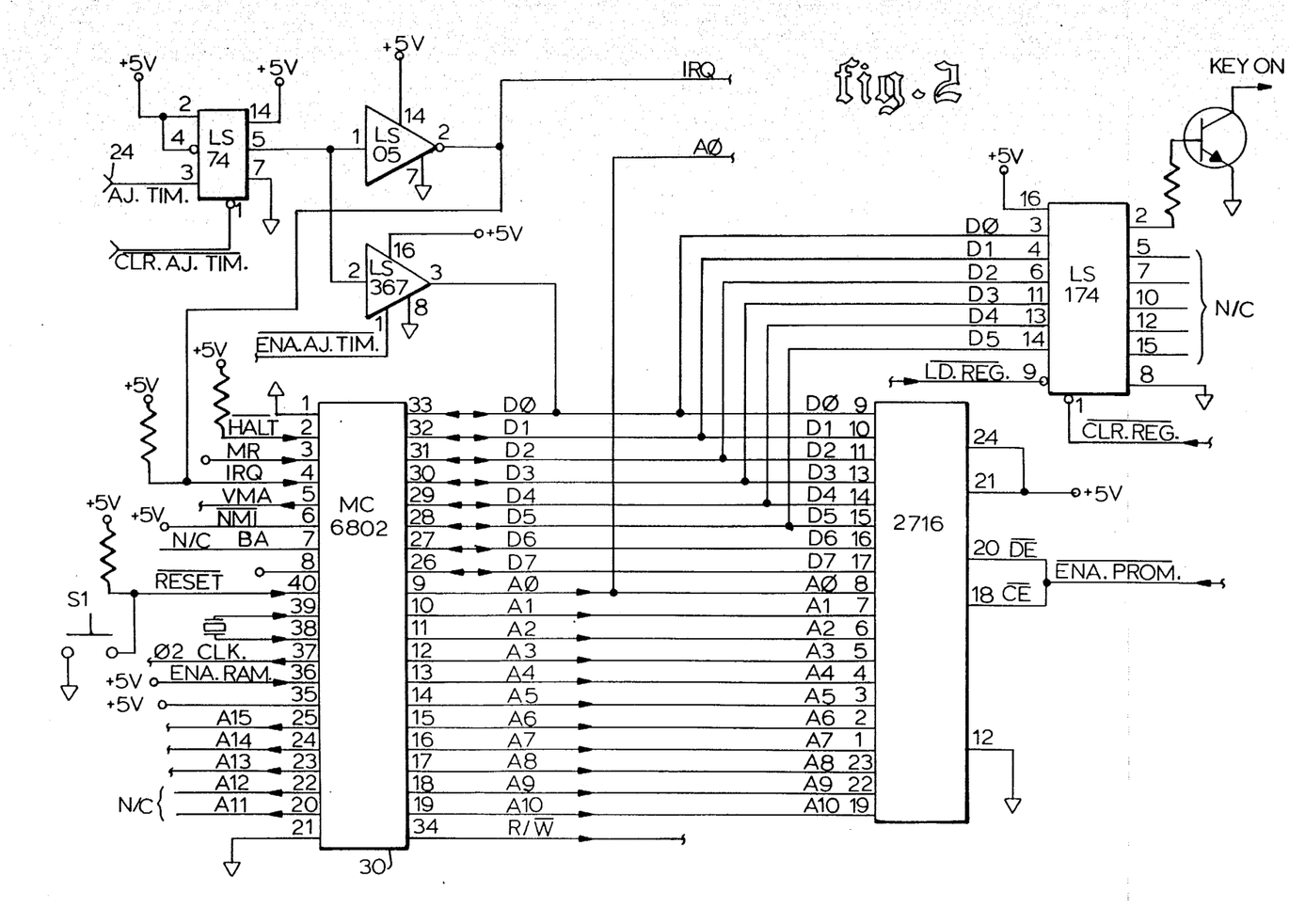
FIG. 2 is a detailed schematic diagram of the programmed apparatus controller section of the system of this invention showing the message buffer and timing circuitry.
Figure 2A:
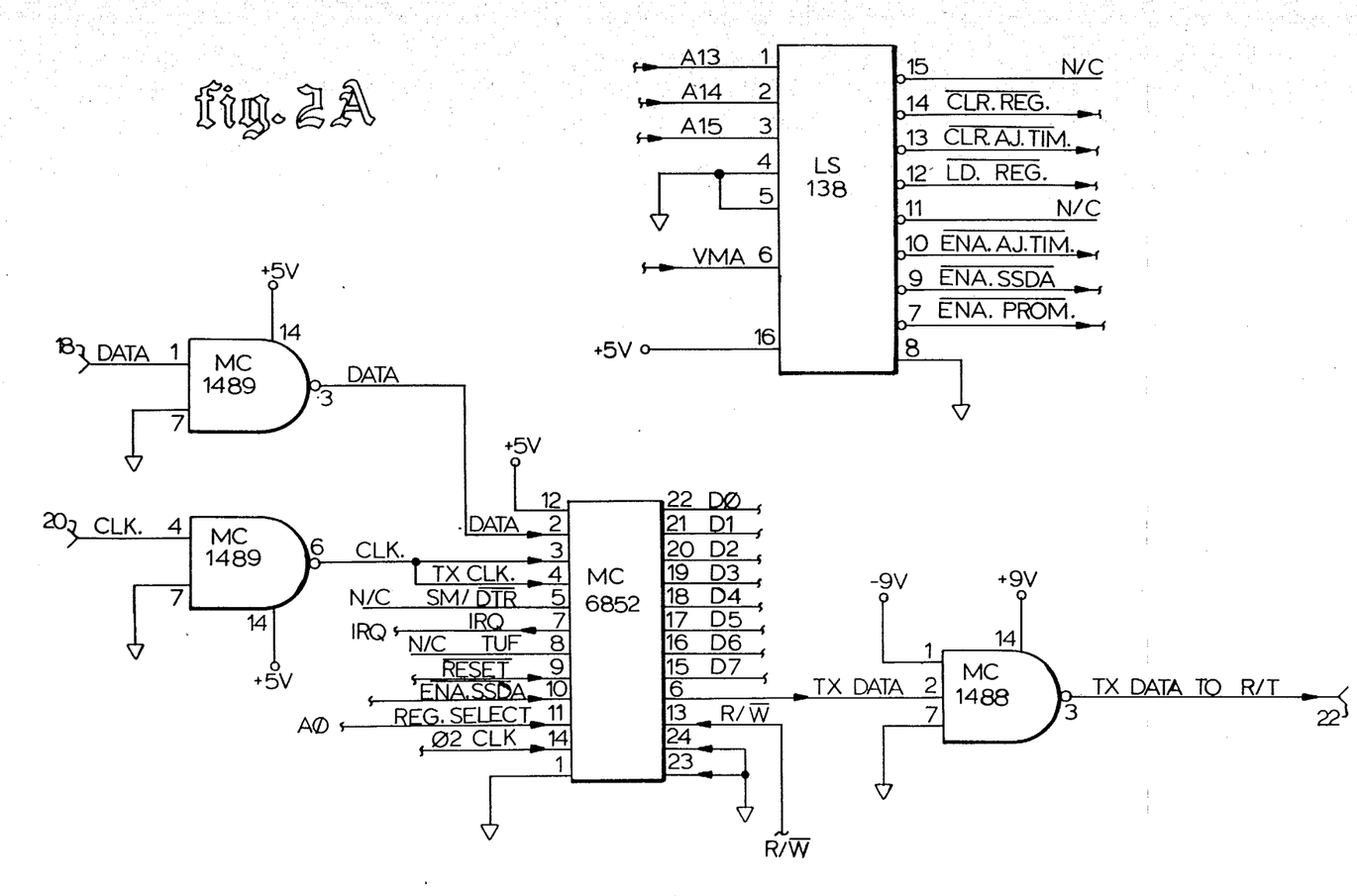

The detailed schematic diagrams shown in FIGS. 2 and 2A disclose the hardware used to accept and buffer digital data messages until the appropriate time (29.1 milliseconds after the positive going edge of AJ TIM) when the up link message may be initiated by the transmitter. 200 microseconds before this time occurs, the KEY ON signal to the transmitter 14 is activated, allowing the transmitter power amplifier (not shown) to build up to full power prior to actual data transmission. After the 200 microseconds have elapsed, the data is sent to the transmitter over line 22. The system microprocessor in this embodiment is a MC 6802 which is an 8-bit processor with 128 bytes of random access memory (RAM) on the same chip. Control of message buffering and timing functions is resident in the microprocessor which operates under control of the 2716 EPROM which is a 2K-byte ultraviolet erasable programmable read only memory. The instructions in the ROM cause the microprocessor 30 to execute a program which controls the data flow. The flow charts shown in succeeding FIGS. 3-9 detail this operating program.

The data which is received from the message source 12 is in serial format and must be converted into 8-bit bytes for convenient handling and storage. This task of converting from serial to parallel and of converting back from parallel to serial prior to transmission is performed by the MC 6852 chip under control of the microprocessor 30. Other elements on FIG. 2 include the LS 174 chip which is a hex D-type flip flop, also called a register. This chip allows data from the processor 30 to be latched and used for external "commands", for example, the KEY ON function. Another element is the LS 138 chip which is a 3-to-8 line decoder, which divides the memory space of the processer 30 into eight equally sized blocks. The processer 30 uses "memory mapped I/O", a technique in which I/O devices are assigned a memory address in the same manner as standard memory devices such as RAM and EPROM. Specifically, the memory space is divided as follows:

| DECIMAL ADDR | HEX ADDR | FUNCTION |
| --- | --- | --- |
| 0000–8191 | 0000–1FFF | Not used |
| 8192–16,383 | 2000–3FFF | Clear the LS174 register |
| 16,384–24,575 | 4000–5FFF | Clear the AJ TIMING flip flop |
| 24,576–32,767 | 6000–7FFF | Load the LS174 register |
| 32,768–40,959 | 8000–9FFF | Not used |
| 40,960–49,151 | A000–BFFF | Enable state of AJ TIMING flip flop onto bus |
| 49,152–57,343 | C000–DFFF | Enable 6852 (SSDA) circuit |
| 57,344–65,535 | E000–FFFF | Enable EPROM |

Whenever an address within the indicated range appears on the bus, the associated LS 138 output goes to the logic zero state. This resulting pulse may be used for software control of various functions such as those listed above. Reading from top to bottom on the right side of the LS 138 chip, the first output is not used, and the second is used to clear the LS 174 to all logic zeros. The third output is used to clear the flip flop which is set every 62.5 milliseconds by the rising edge of the AJ TIM signal, while the sixth output is used to allow the state of the flip flop to be read into the processor 30 through the LS 367 gate. This information is required by the processor in order to determine whether the AJ TIM flip flop or the 6852 chip (a synchronous serial data adapter) is causing an interrupt signal ($\overline{IRQ}$). This anti-jamming timing signal is input into the LS 74 chip along with a $\overline{CLR\ AJ\ TIM}$ (NOT clear anti-jam timing) signal and various power inputs. The output branches and passes in one leg through an LS05 gate and from there to the line connecting the output signal $\overline{IRQ}$ from the MC 6852 chip to the respective $\overline{IRQ}$ input on the MC 6802 chip. The other branch from the LS74 output passes into the LS 367 chip which also has an input of the $\overline{ENA\ AJ\ TIM}$ (NOT enable anti-jamming timing) signal. And from there connects to the internal data bus line D0. The properly timed serial data output from the system passes to the receiver transmitter, not shown, over the TX DATA output line from the MC 6852 chip through the MC 1488 NAND gate and out over line 22. The remaining chips in the diagram have straightforward interconnections with one another, including the MC 6802 microprocessor chip, the 2716 EPROM chip, the LS 174 chip and the LS 138 chip. The only output from the LS 174 chip is the KEY ON signal which is output from terminal Q1 of this chip. The $\overline{RESET}$ signal originates from pushbutton switch S1 in this implementation. However, this signal, which initializes the processor and other components, could be generated by a standard circuit which detects that power has been applied.

Figure 3:
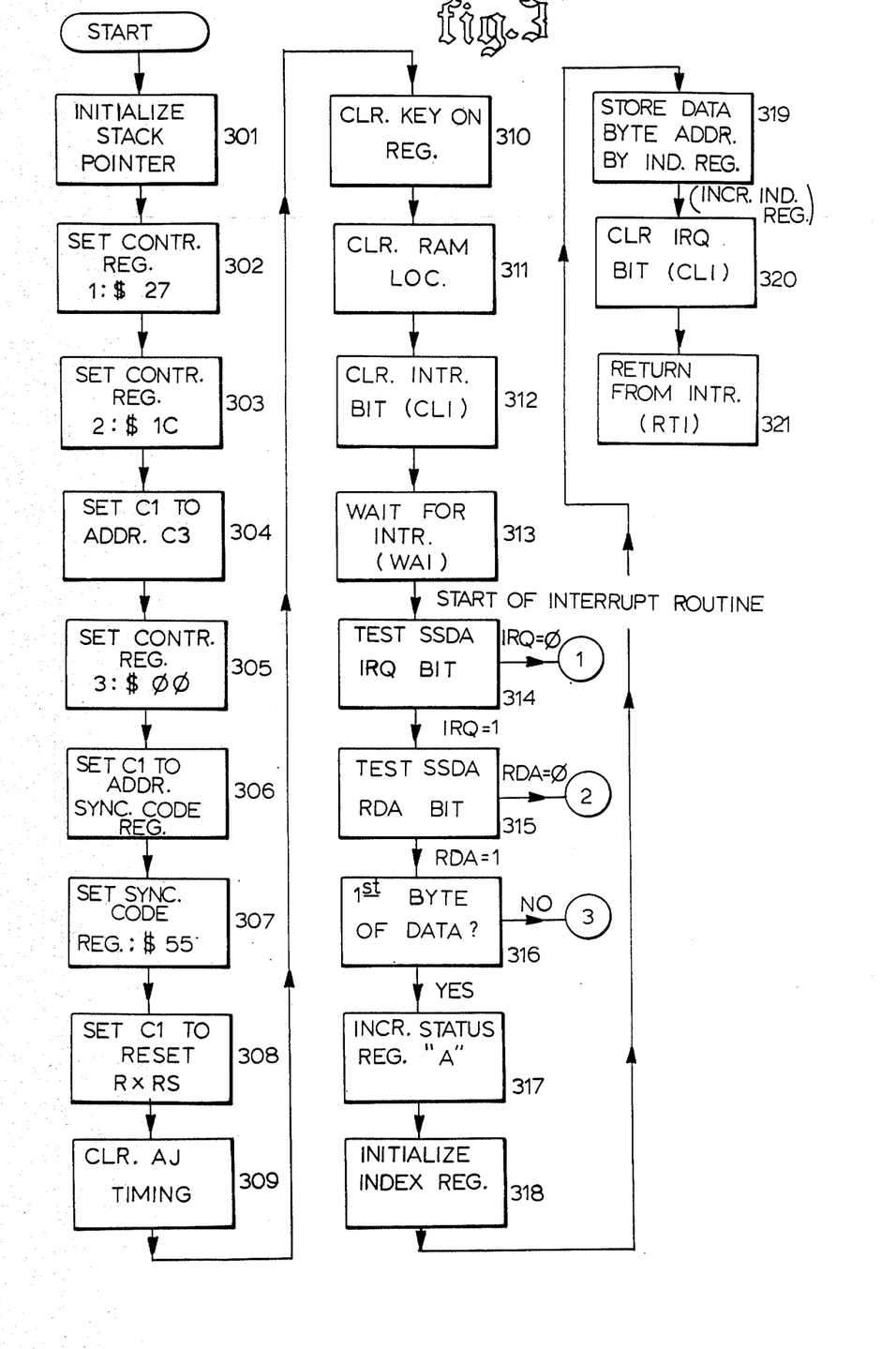
FIG. 3 is a flow chart of the main operating program for the microprocessor in the programmed apparatus controller section of the system of this invention.

FIGS. 3-9 are flow charts for the main operating routine and its various subroutines. FIG. 3 is the flow chart for the main routine and utilizes standard nomenclature and acronyms to describe the various steps in the routine.

Blocks 302 through 308 refer to steps taken to initialize the MC6852 SSDA. This device has three different control registers which determine its various operating modes and thus must be set up during the "RESTART" or initialization routine (blocks 301 through 313 of FIG. 3). The nomenclature used in block 302 "SET CONTR REG 1:$ 27" means "load the hexidecimal number 27 into SSDA control register number 1." Likewise, block 303 indicates hex 1C is loaded into control register 2. Block 304 indicates that control register 1 (C1) must be changed before control register 3 (C3) may be addressed because two of the bits in C1 control access to the other control and sync code registers.

In practical terms, blocks 302 through 308 enable SSDA receive interrupts, disable transmit interrupts, cause the SSDA to delete bytes which match the selected sync bytes, hold both the receive and transmit sections in the reset state (temporarily), disable error interrupts, select word length =8 bits, select one byte at-a-time data transfers, selects $55 as the sync code, then enables the receive section. The SSDA data sheet published by Motorola is readily available should further detail be required.

Blocks 309 through 312 clear other functions and complete the initialization. Block 313 indicates that the instruction WAI (wait for interrupt) is then executed. This causes the processor to go into an idle state and literally do nothing until an interrupt occurs. When an interrupt does occur, the processor tests a bit in the SSDA status register (IRQ bit) to determine if the SSDA is causing the interrupt. If not, the processor branches to the flow chart of FIG. 4, otherwise the processor tests the receiver data available (RDA) bit from the SSDA status register. If RDA=1, indicating the SSDA has a byte of received data ready to transfer, the procesor checks an internal status register in RAM to determine whether this is the first byte of a new message. If RDA=0, the processor branches to FIG. 5 and, if this byte is not the first byte, it branches to FIG. 6.

Blocks 317 and 318 update internal status for keeping track of the current received message (from 2 of FIG. 1). Block 319 indicates that the data byte is stored in RAM at the address pointed to by the index register. The index register is then incremented. Block 320 clears the interrupt mask bit so that the processor will respond to subsequent interrupt requests (IRQ). The RTI instruction causes the program to return to the instruction immediately following the instruction in progress when the last IRQ occurred. In this program, the processor is normally in WAI when an IRQ occurs and the WAI is followed by a branch back to the WAI. Thus the program returns (upon RTI) to the branch instruction and again performs WAI and waits for the next IRQ.

Figure 4:
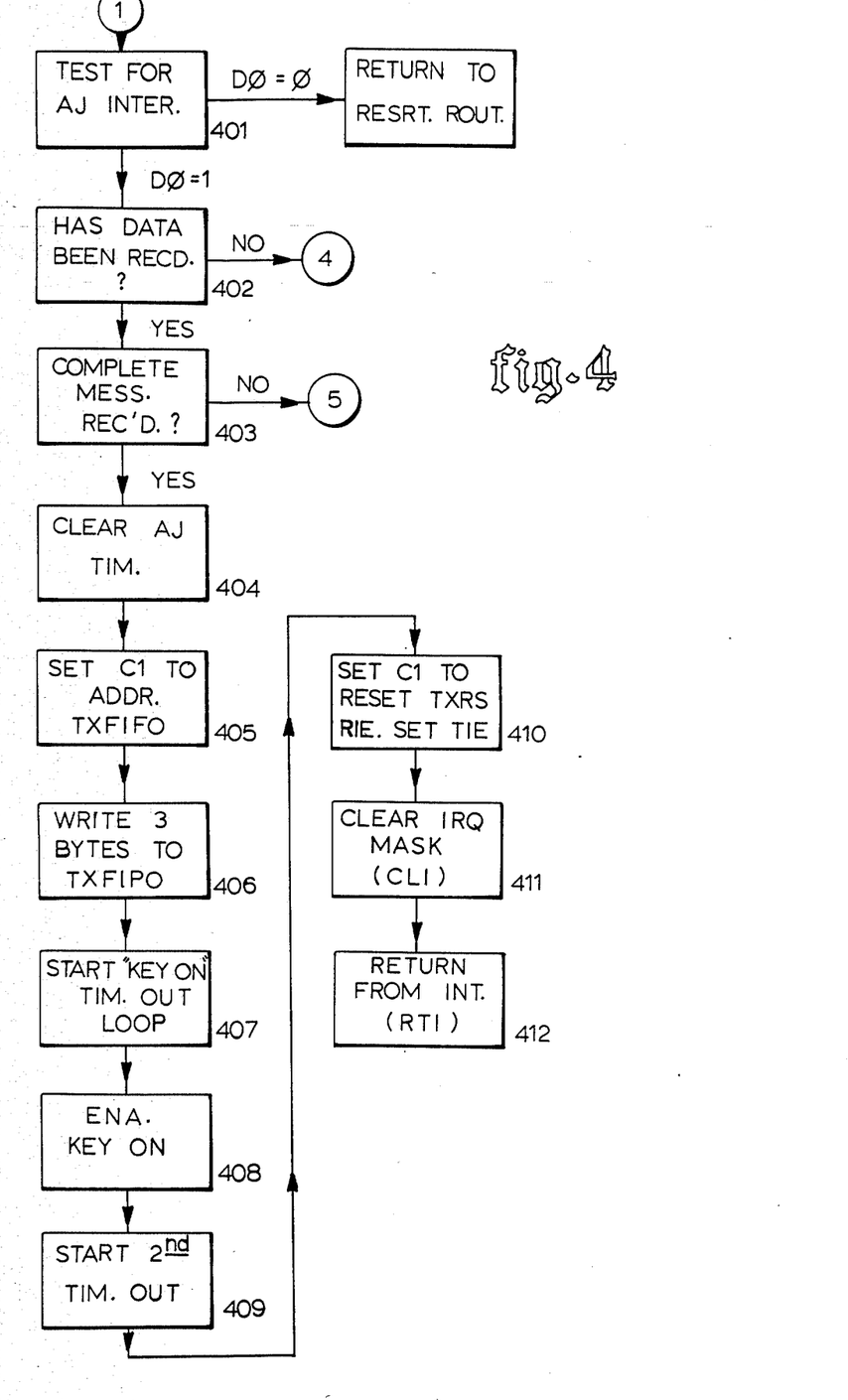
FIGS. 4, 5, 6, 7, 8 and 9 are flow charts of various subroutines of the main operating routine shown in the flow chart of FIG. 3.

FIG. 4 shows the first subroutine which handles the AJ TIM interrupt and starts the transmission of a message after the appropriate delay if a complete message has been stored awaiting transmission. The processor first tests to see if an AJ TIM interrupt has occurred. If not, there is a problem, i.e., the processor believes an IRQ has occurred, but neither possible source claims to have generated it. The processor will therefore branch back to the beginning of the RESTART routine and start over.

Block 405 indicates that SSDA control register 1 (C1) must be set up to allow the transmit data first-in first-out register (TX FIFO) to be addressed. The 6852 has a "3-deep" FIFO so that 3 bytes may be loaded initially before actual transmission begins. Block 409 is a delay to properly place the message within a stable frequency period. Block 410 is the manipulation? of C1 to remove the reset from the transmit section (RESET TXRS), disable receive interrupts (RESET RIE) and enable transmit interrupts (SET TIE), i.e., start transmitting data.

Figure 5:
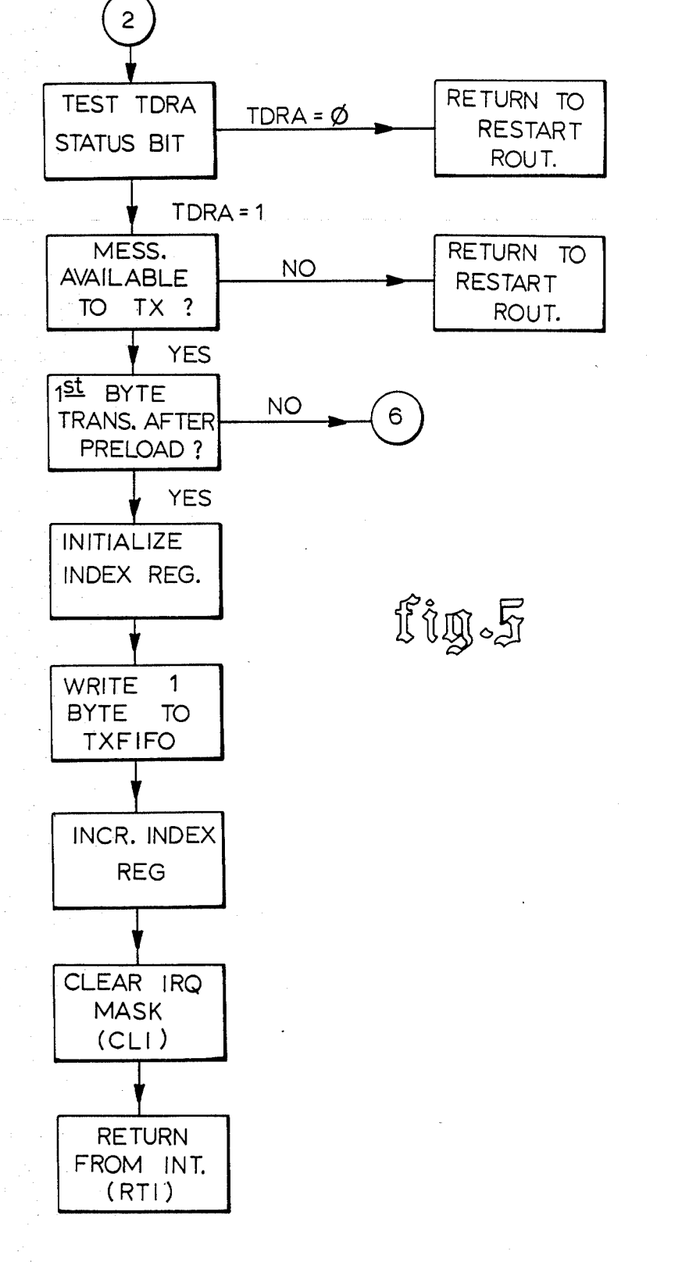

FIG. 5 shows the second subroutine. This subroutine checks for two abnormal conditions, i.e., the SSDA has caused an interrupt, but neither the receive data available (RDA) nor the transmit data register available (TDRA) bit is set (=1) or the TDRA =1, but no message is available to transmit. If either condition is true, the program branches to RESTART. If neither is true, the fourth byte of the message (first byte after the first three bytes are "preloaded" in FIG. 4) is loaded for transmission and the index register is initialized to point to this message.

Figure 6:
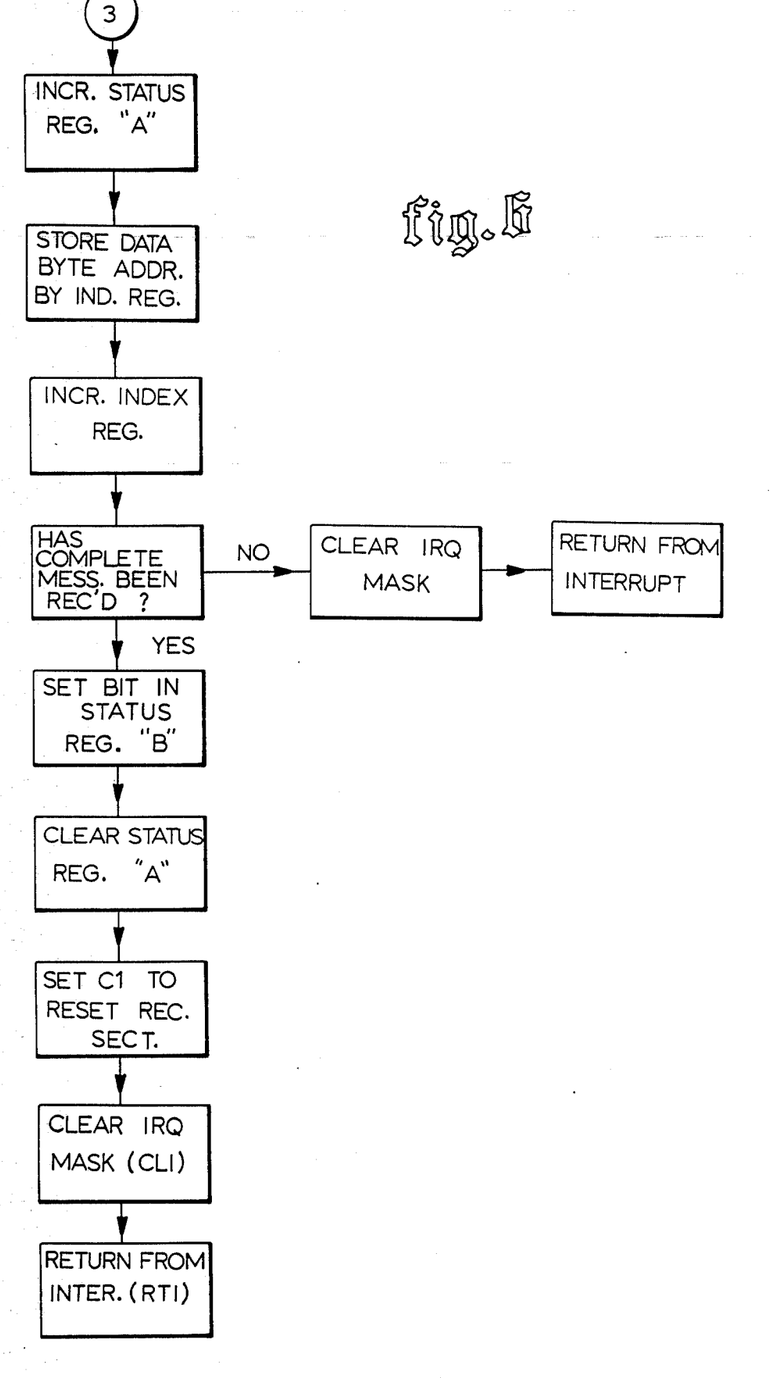

FIG. 6 shows the third subroutine. This subroutine handles the recurring reception and storing of data bytes until the message from 12 (FIG. 1) has been completed. When the message is complete, the SSDA is set up to begin looking for another message and internal status registers are reset.

Figure 7:
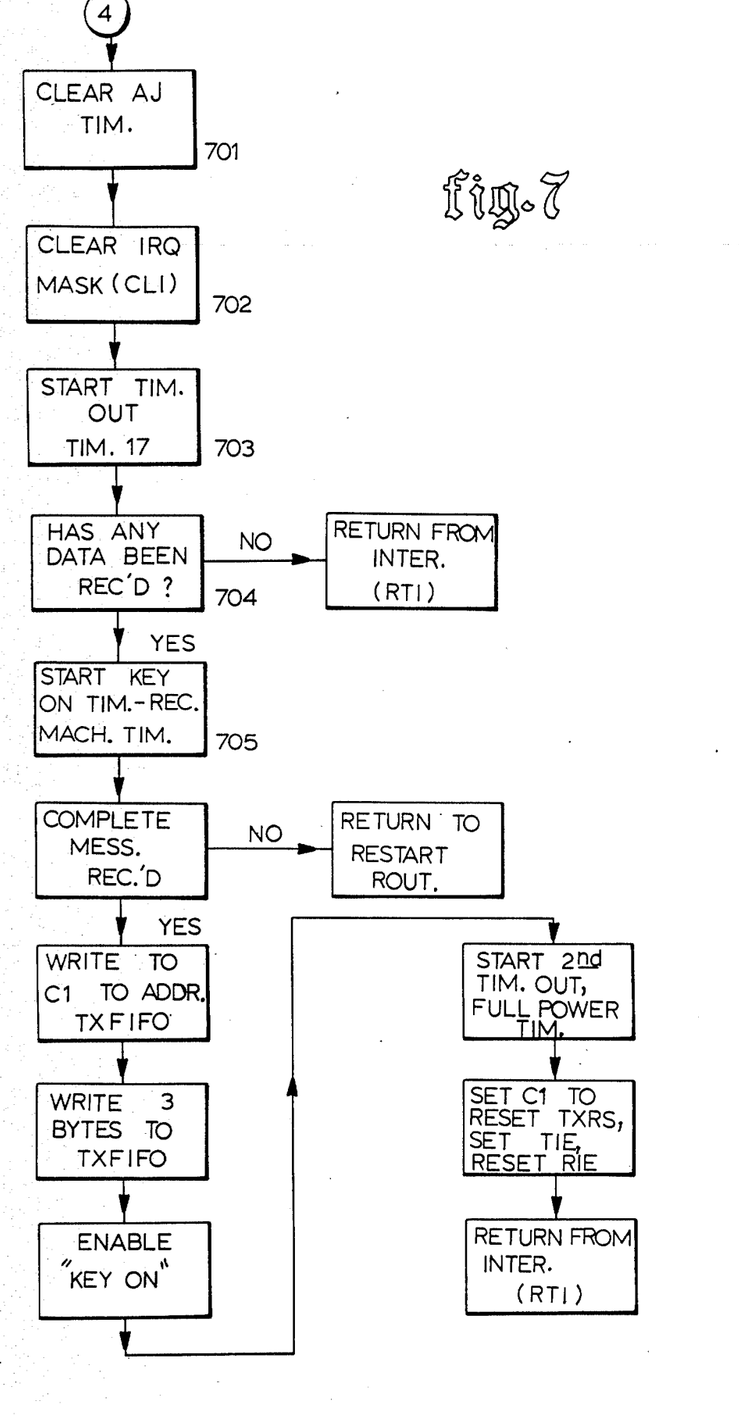

FIG. 7 shows the fourth subroutine. This subroutine covers the case where no message is stored for transmission when the AJ TIM interrupt occurs. the program delays (in two time increments) until just before a transmit message must begin before looking for a receive message. These two time increments are found in blocks 703 and 705. In block 703, "TIM 17" represents a 17.2 ms interval. In block 705, "REC MACH TIM" represents a time interval of 11.9 ms minus the time necessary for the processor to complete the next four blocks (machine time). If a complete message is received before transmit time, the transmission begins as in FIG. 4.

Figure 8:
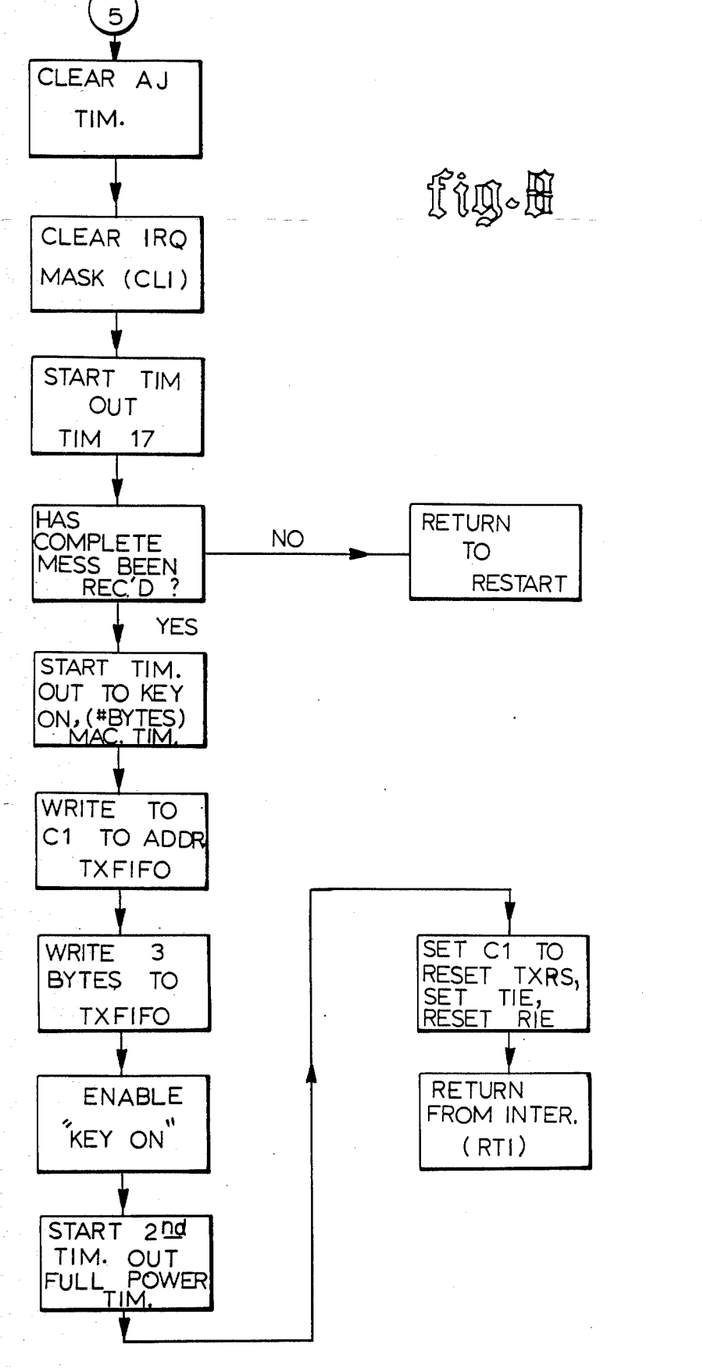

FIG. 8 shows the fifth subroutine. This subroutine is similar to FIG. 7 except that the received message had begun but was not complete when the AJ TIM interrupt occurred. The program delays, insures the received message is complete, delays the remainder of the 29.1 ms wait time and begins the transmission.

Figure 9:
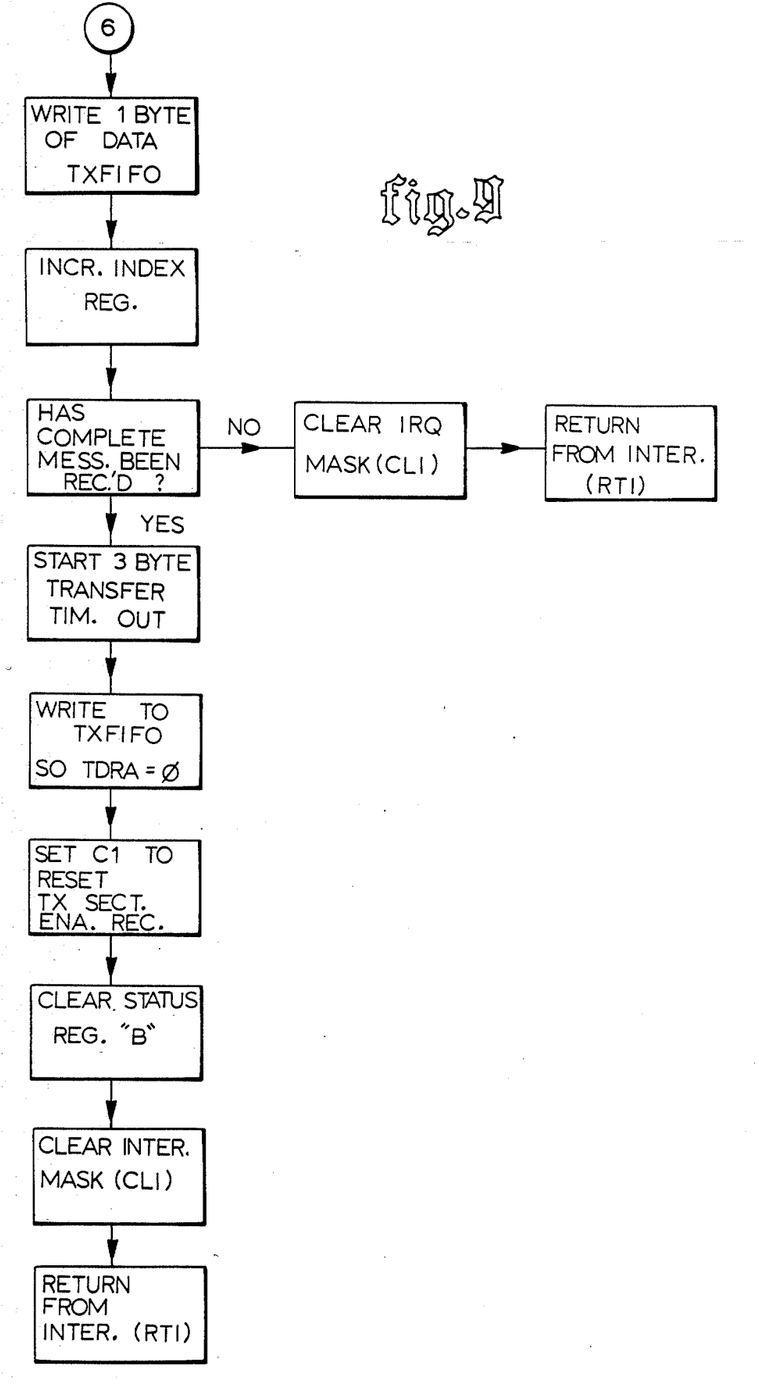

FIG. 9 shows the sixth subroutine. This subroutine handles the recurring task of taking bytes of stored data from RAM (having been stored there as received from 12) and loading them to the SSDA for transmission until the message is complete.

We claim:

1. In an AM radio system capable of changing its frequency at regular intervals in a known manner which includes a timing information supply means describing first timing intervals when the frequency is constant at a given frequency and second timing intervals when the frequency transitions between the first intervals, the improvement comprising:

a digital data uplink/downlink controller comprising;
a programmable microprocessor control means having as one input timing information received from the timing information supply in the AM radio system to mark transition points between the first and second timing intervals, having as a second input digital data information received from an external source wherein the microprocessor is programmed to allow reception of an uplink FM digital data radio message by the radio system only during a first fixed sub-interval of the first timing interval and is further programmed to allow the transmission of a downlink FM digital data radio message of the digital data received from the second input to the microprocessor only during a second fixed sub-interval of the first timing interval such that the first and second sub-intervals are separated from each other and from the ends of the first timing interval by fixed amounts of time sufficient to allow for effective radio communication, and means to place FM digital data upon the AM radio system transmitted downlink signal and to remove FM digital data from the AM radio system received uplink signal.

2. The system of claim 1 wherein the digital data uplink/downlink controller further includes buffer means for temporary storage of the input digital data information.

* * * * *

UNITED STATES PATENT AND TRADEMARK OFFICE
CERTIFICATE OF CORRECTION

PATENT NO. : 4,630,282

DATED : 16 December 1986

INVENTOR(S) : William A. Landers, et al.

It is certified that error appears in the above—identified patent and that said Letters Patent is hereby corrected as shown below:

In column 5, line 44, the number [2] should be 12.

Signed and Sealed this

Twelfth Day of July, 1988

Attest:

DONALD J. QUIGG

*Attesting Officer*   *Commissioner of Patents and Trademarks*